United States Patent
Pozdeev-Freeman et al.

(10) Patent No.: US 6,319,292 B1
(45) Date of Patent: Nov. 20, 2001

(54) METHOD FOR MAKING CAPACITOR PELLET AND LEAD ASSEMBLY

(75) Inventors: Yuri L. Pozdeev-Freeman, Kennebunk, ME (US); Boris Levi; Semion Akselrod, both of Beersheva (IL)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 09/586,632

(22) Filed: Jun. 5, 2000

Related U.S. Application Data

(62) Division of application No. 09/283,720, filed on Apr. 1, 1999, now Pat. No. 6,212,065.

(51) Int. Cl.[7] .................. H01G 9/00; H01G 4/232; H01G 4/228
(52) U.S. Cl. ............ 29/25.03; 361/308.3; 361/309; 361/520; 361/540
(58) Field of Search ................. 29/25.01–25.03; 361/308.3, 310, 309, 308.1, 772, 520, 531, 538, 540

(56) References Cited

U.S. PATENT DOCUMENTS

| 4,791,532 | 12/1988 | Gouvernelle et al. ............ 361/529 |
| 6,085,122 | * 7/2000 | Manning ........................ 700/212 |

OTHER PUBLICATIONS

17th Capacitor and Resistor Technology Symposium. CARTS '97. Mar. 24, 27, 1997. Sponsored by The Components Technology Institute, Inc.

* cited by examiner

*Primary Examiner*—Ha Tran Nguyen
(74) *Attorney, Agent, or Firm*—Zarley, McKee, Thomte, Voorhees & Sease

(57) ABSTRACT

A capacitor includes a porous pellet formed from compressed conductive particles. The pellet has a lead receiving external surface. The conductive particles at the lead receiving surface are fused together to create a fused layer on the external surface of the pellet. A lead wire has one of its ends welded to the fused layer on the surface of the pellet. The fused layer is formed by exposing it to high temperatures, preferably by use of a laser beam.

3 Claims, 4 Drawing Sheets

METHOD FOR MAKING CAPACITOR PELLET AND LEAD ASSEMBLY

CROSS REFERENCE TO A RELATED APPLICATION

This application is a division of Ser. No. 09/283,720 filed Apr. 1, 1999 now U.S. Pat. No. 6,212,065.

BACKGROUND OF THE INVENTION

Solid tantalum capacitors use as anodes porous pellets which are compressed from fine tantalum and niobium powder. The pellets are first compressed and then they are sintered in a vacuum. The porous structure of the anode provides a high surface area and thereby high specific charge (CV) of the finished capacitors (where CV is a product of capacitance and rated voltage). Generally tantalum pellets contain a lead wire made of the same metal as the compressed powder. The lead wire is attached to the pellet either by welding after the pellet has been sintered, or by embedding in the pellet before the pellet is pressed and sintered.

A major trend of modern tantalum capacitors is reducing of the efficient radius of the powder particles so as to increase the pellet surface and thereby improve the capacitor CV per unit of weight or volume. Usages of very fine tantalum powder requires changing of the pelleting conditions. As the efficient particle radius becomes small the pellet density after pressing (green density) as well as the sintering temperature must be reduced to limit pellet shrinkage during sintering. Reducing of the green density and the sintering temperature causes weakening of the junction between the lead and the pellet for both embedded type pellets and welded type pellets. This causes capacitor rejects at manufacturing and failures at testing. The weakening of the junction between the lead and the pellet is one of the major limitations for usage of very fine tantalum with efficient particle radius of about one micron.

FIGS. 1 and 2 show a prior art capacitor 10 having a lead wire 14 welded to a tantalum pellet 12.

During the welding process the lead wire 14 is pressed against the upper surface of the pellet 12 and heated by current pulse. For low density pellets sintered at low temperature this combination causes cracks of the pellet around welding zone in the area indicated by the numeral 18. The resulting weld 16 may be weakened as a result of the fractured area 18. This is particularly true for tantalum and niobium powder with a particle radius of about one micron or less.

Therefore, a primary object of the invention is the provision of an improved capacitor pellet and lead assembly and method for making same. A further object of the present invention is the provision of an improved capacitor having a lead wire welded to a pellet of low density and small particle size.

A further object of the present invention is the provision of a capacitor having a low density pellet of small particle size which exhibits good AC characteristics.

A further object of the present invention is the provision of a method for welding the lead wire to the pellet which minimizes the fracturing of the pellet during the welding operation.

A further object of the present invention is the provision of a capacitor and method for making same which is efficient in operation, durable in use, and includes high performance characteristics for small particle pellets.

SUMMARY OF THE INVENTION

The foregoing objects may be achieved by a capacitor comprising a porous pellet having compressed conductive particles therein. The pellet includes a lead receiving external surface. The conductive particles at the lead receiving surface are fused together to create a fused layer on the external surface of the pellet. A lead wire has one of its ends welded to the fused layer of the lead receiving surface.

Different methods may be used for fusing the lead receiving surface on the top of the pellet. The preferred method is the use of a laser beam which can be scanned back and forth to create a fused or partially melted area on the surface of the pellet.

The lead wire during the welding operation is pressed against the fused area on the surface of the pellet. The fused surface is harder then the remainder of the pellet, and therefore resists fracturing during the welding process. When the welding is complete, the lead wire and the fused area fuse together without any perceptible fractures at the junction or the weld joint.

BRIEF DESCRIPTION OF THE PREFERRED EMBODIMENT

Figure 1:
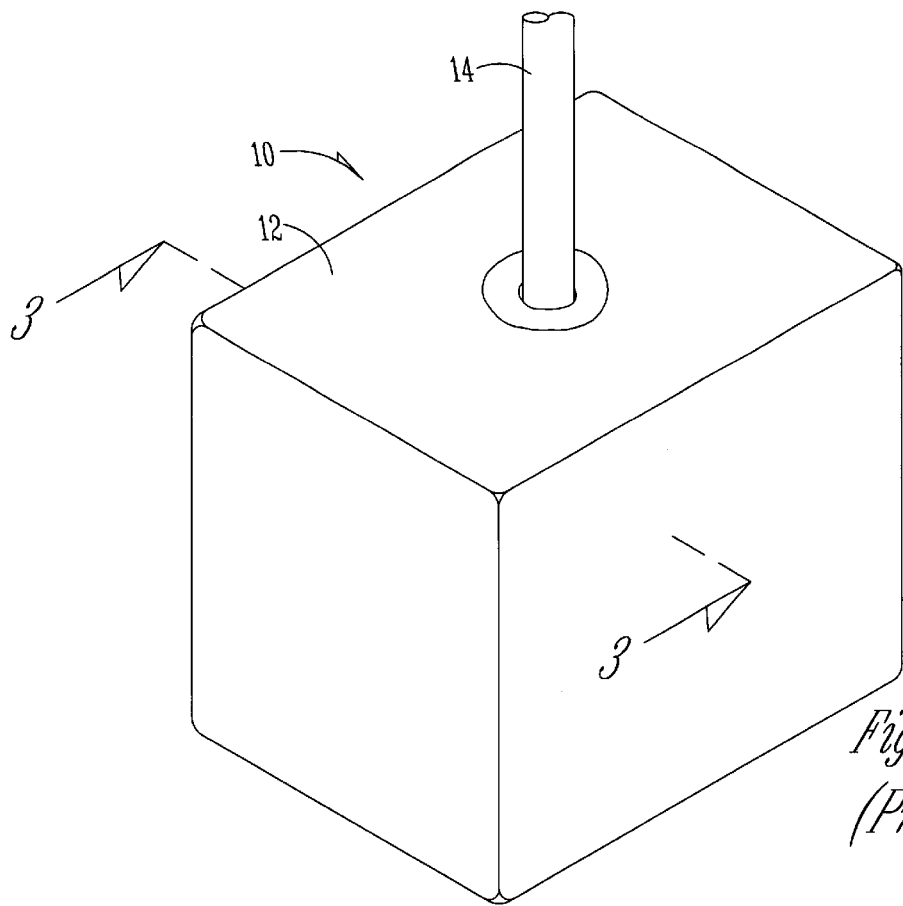
FIG. 1 is a perspective view of a prior art capacitor pellet.
Figure 2:
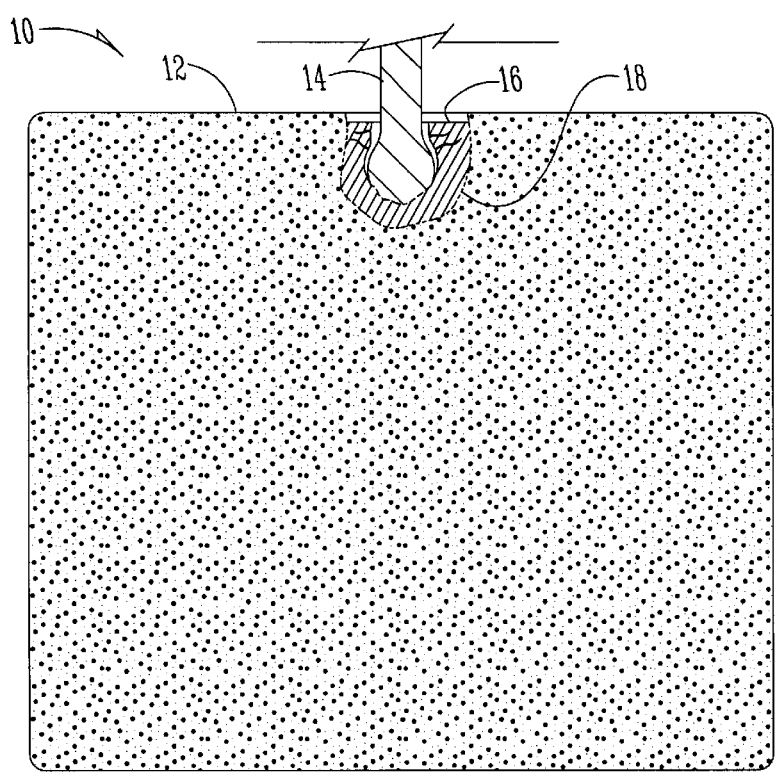
FIG. 2 is a sectional view taken along line 1—1 of FIG. 1.
Figure 3:
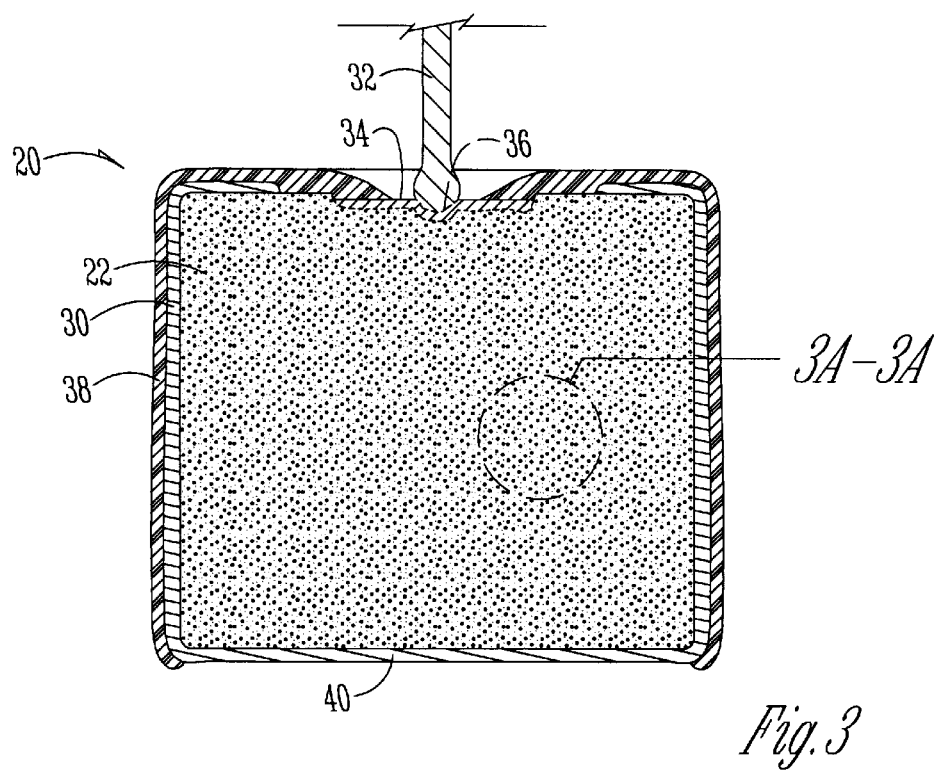
FIG. 3 is a sectional view similar to FIG. 2, but showing a cross section of the capacitor pellet of the present invention.
Figure 3A:
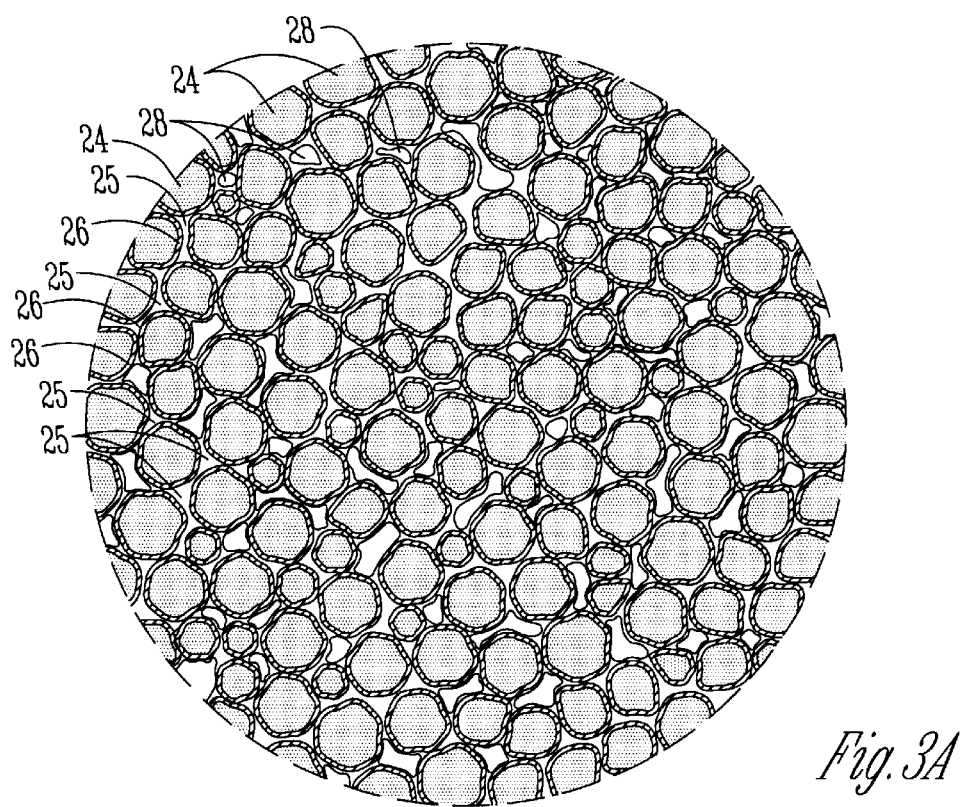
FIG. 3A is an enlarged detail taken within line 3A—3A of FIG. 3.

Referring to FIGS. 3–6 a tantalum capacitor 20 is shown and includes a pellet 22 comprised of pellet particles 24. The pellet particles are a fine powder of tantalum. However, niobium or other valve metals may be used as well. The term "valve metals" includes any other metal conventionally used for the manufacture of electrical capacitors. The pellet is formed by compressing the powder and sintering it in a vacuum. This causes the powder particles 24 to fuse together, forming a porous sponge like structure having numerous cavities 25 between the particles. All of the particles 24 are in electrical contact with one another and form the anode of the capacitor.

Each of the pellet particles 24 is exposed to electrochemical oxidation in a liquid electrolyte so as to create an oxide dielectric coating 26 of tantalum oxide around all of the particles. This forms a dielectric barrier between the particles and the various cavities therebetween.

Figure 4:
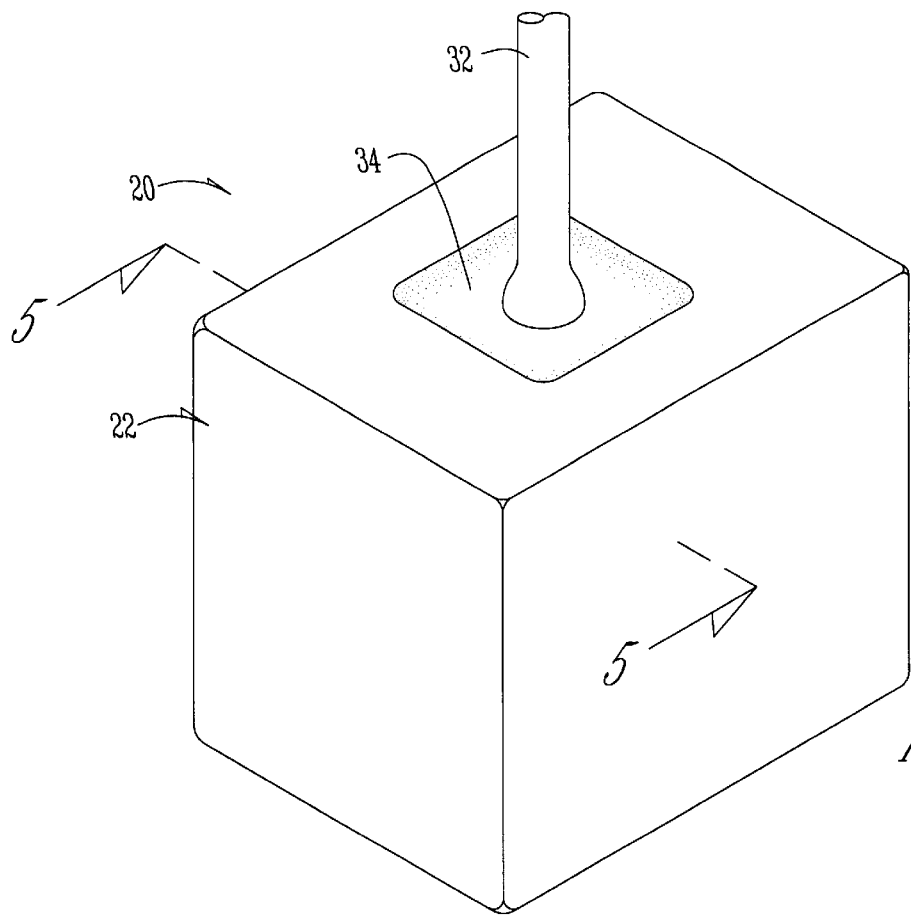
FIG. 4 is a perspective view of the present invention
Figure 5:
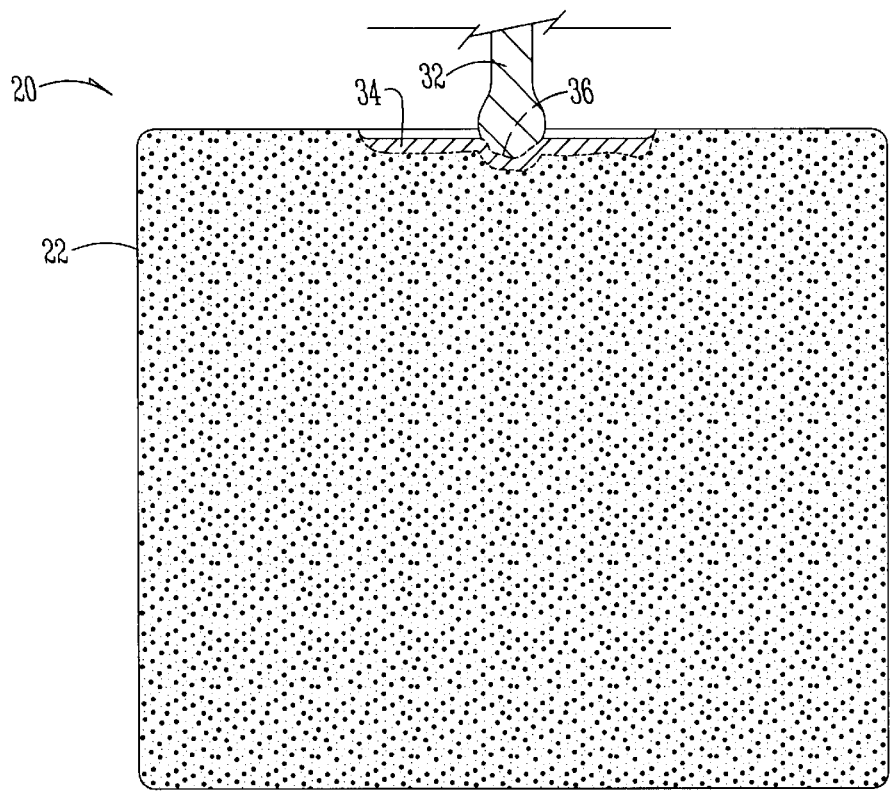
FIG. 5 is a sectional view taken along line 5—5 of FIG. 4.

Next the pellet is subjected to manganese oxide which infiltrates into the cavities or voids 25 and which is shown schematically by the numeral 28 in FIG. 4. The manganese oxide is an electrical conductor which forms the cathode of the capacitor and which is separated from the particles 24 by the dielectric oxide coating 26. Conductive polymers could be also used as a cathode.

Surrounding the pellet 22 is a conductive cathode coating 30 which may be graphite, silver or other highly conductive material. Coating 30 is in electrical contact with the manganese oxide 28 which forms the cathode but is insulated from the particles 24 which form the anode.

Surrounding the cathode coating 30 is a dielectric coating 38 which leaves the cathode coating 30 exposed at the bottom of the pellet to provide an exposed cathode connection 40.

An anode lead 32 is welded to a fused area 34 at the top of the pellet 22. The anode lead 32 is preferably made of the same material as the powder in the pellets, and the welding of the anode lead 32 to the top of pellet 22 places the anode lead in contact with all of the pellet particles 24. The numeral 36 refers to the weld joint between the anode lead 32 and the fused area 34.

The purpose of the present invention is the strengthening of junction between the anode lead 32 and the pellet. This purpose can be accomplished by local laser treatment of the pellet surface before the lead wire 32 is welded to the pellet surface. The strength of the junction between the lead 32 and the pellet 22 is high in the case of laser treated pellets and very low for non treated ones. For instance, pull out test data for a prior art pellet demonstrated that the lead wire could be separated when exposed to a tension force of 0.27 kilograms. That same pellet when treated with laser treatment demonstrated that the lead wire would not pull out until exposed to 1.2 kilograms of force.

Figure 6:
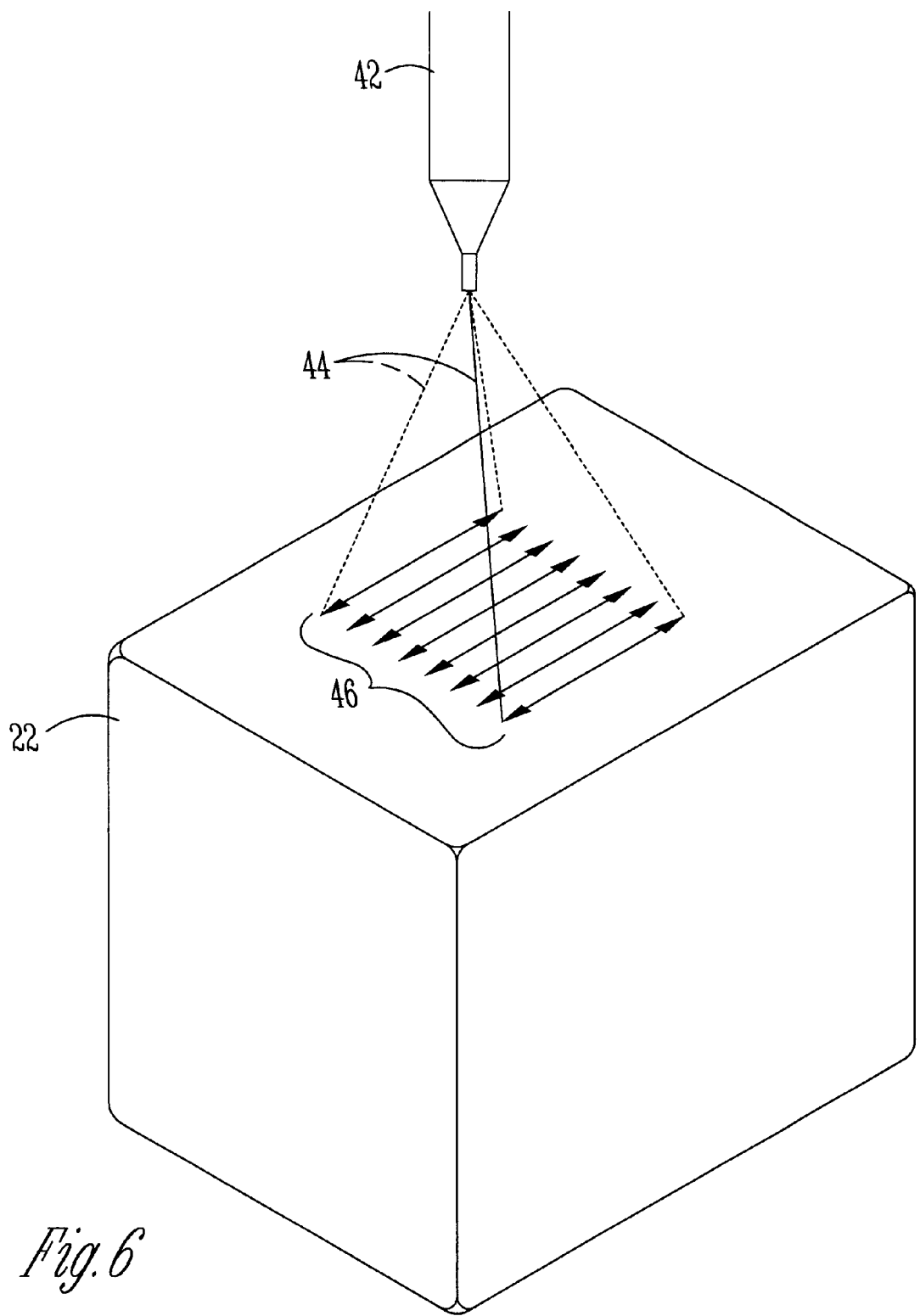
FIG. 6 is a perspective view of the capacitor pellet showing a laser projector forming a fused area.

In the manufacture of the pellet, the first step is to pressurize the pellet and sinter it in a vacuum. FIG. 6 illustrates a pellet which has been constructed in this manner.

The next step is to fuse the surface of the pellet at the point where the lead wire will be welded. This area is demonstrated by the numeral 46. A laser projector 42 projects a laser beam 44 down to the surface of the pellet and moves in a scanning direction indicated by the arrows in the area 46. This results in a fused area 34 (FIGS. 4 and 5) which is well crystallized and hardened versus remainder of the pellet.

Next the lead wire 32 is pressed against the fused area 34 and is welded to the fused area in a conventional manner. The welded area 34 resists the pressure from the lead wire 32 during the welding process, and is less likely to break or fracture as is often the case with non laser treated pellets. As a result the welded area 36 between the lead wire 32 and the pellet 22 is well crystallized and substantially free of cracks or voids.

The power of the laser beam used for the pellet treatment should provide an optimal thickness of the consistent layer on the pellet surface. Depending upon the pellet green density and the lead wire diameter this thickness ranges from 0.1 to 10 microns (preferably 0.05 to 2.5 microns). The thinner consistent layer may be destroyed by the lead wire during welding. The thicker consistent layer causes excessive capacitance loses and a disruption from the porous pellet. Also a thicker consistent layer may cause high direct current leakage in the final capacitor. To achieve uniform thickness of the consistent layer the scanning laser with a small scanning step should be used. To protect pellets from thermal oxidation and burns during laser treatment an inert atmosphere (preferably argon gas) is used for the laser treatment.

Various types of lasers may be used for this invention. The preferred laser for use is a laser identified by the name Script Laser System, manufactured by Control Laser Corporation, Florida USA.

In one example of the present invention, a Ta powder with 70 k $\mu$FV/g specific CV was pressed in to pellets 6 mm×6 mm×2 mm with green density 4.6 g/cc and after that sintered in vacuum at 1300° C. for 20 min. These pellets were laser treated in argon gas using following laser parameters: current 9A, Q-switch frequency 10 kHz, scanning speed 24 inches/sec. The laser used was a 50 Watt Nd:YAg (Neodymium Yttrium Aluminum garnet) laser.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for making a capacitor comprising: compressing a quantity of conductive particles into a porous pellet having an external surface; fusing said conductive particles together at a localized area on said external surface to form a fused layer of said particles at said localized area, said fused layer having a thickness of from 0.05 to 10 microns; positioning one end of a lead wire in contact with said fused layer; welding said one end of said lead wire to said fused layer.

2. A method according to claim 1 and further comprising using a laser to perform said fusing step.

3. A method according to claim 2 and further comprising scanning a laser beam across said localized area to perform said fusing step.

* * * * *